United States Patent [19]  
Stephenson

[11] 3,724,658  
[45] Apr. 3, 1973

[54] PARTICLE SEPARATION IN A GASEOUS FLUID
[75] Inventor: John Stephenson, Cholsey, England
[73] Assignee: United Kingdom Atomic Energy Authority, London, England
[22] Filed: Mar. 20, 1970
[21] Appl. No.: 21,342

[30] Foreign Application Priority Data

Mar. 27, 1969 Great Britain.....................16,246/69

[52] U.S. Cl................................................209/143
[51] Int. Cl. ...................................................B07b 7/086
[58] Field of Search..........209/30, 31, 142, 143, 208, 209/210; 55/270, 274, 418, 461, 503; 73/28, 29

[56] References Cited

UNITED STATES PATENTS 2,540,695  2/1951  Smith et al..........................55/418 X

FOREIGN PATENTS OR APPLICATIONS 447,061  3/1948  Canada ..............................209/143

Primary Examiner—Frank W. Lutter
Assistant Examiner—Ralph J. Hill
Attorney—Larson and Taylor

[57] ABSTRACT

Apparatus for separating particulate matter from a gas, particularly dust from air, selectively according to particle size comprising an inlet passage, a duct in-line with the inlet passage and a re-entrant branch duct into which a predetermined fraction of the gas is diverted, the change of direction of flow of said fraction being such that only smaller particles remain entrained therein and larger particles due to inertial and centrifugal forces are not diverted and are entrained in the undiverted fraction of the gas stream together with the particles entrained in said undiverted fraction. The apparatus may be adapted to provide a lung model simulator.

4 Claims, 3 Drawing Figures

PATENTED APR 3 1973 3,724,658

SHEET 1 OF 2

PARTICLE SEPARATION IN A GASEOUS FLUID

This invention relates to a method and apparatus for size selective separation of particulate matter from a gas and more particularly the selective particle size sampling of dust in air.

There is a requirement for an apparatus which can be used to obtain an estimate of the total dust concentration in a sample of air and also an estimate of the fraction of that dust which would penetrate the pulmonary compartment of a human lung. Curves are available known as lung model deposition curves relating percentage deposition of particles in said compartment to particle aerodynamic diameter and the invention may be adapted to provide an apparatus with a response curve closely matching any lung model curve.

Figure 3:
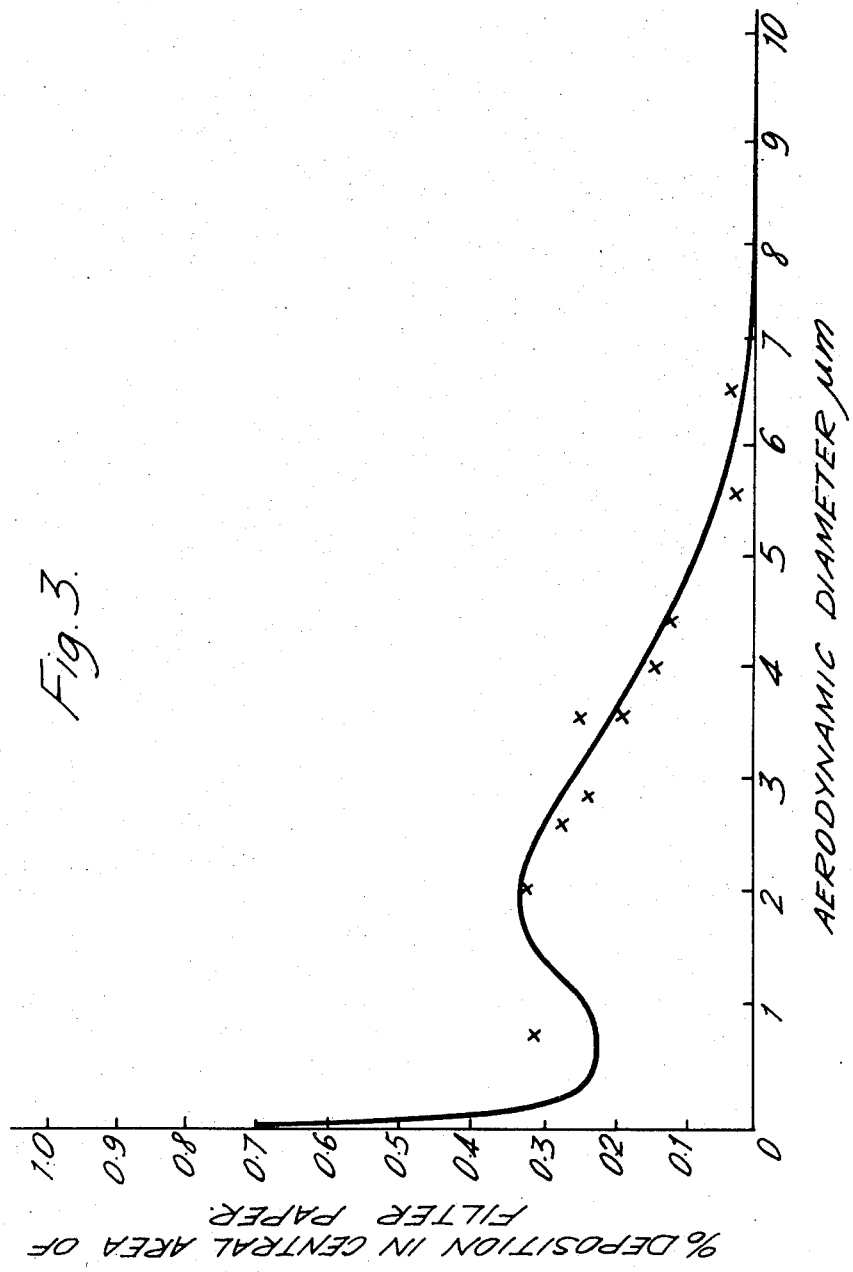

According to the present invention a predetermined fraction of a gas stream carrying particles is diverted into a branch duct, the change of direction of flow of said fraction being such that only smaller particles remain entrained therein and larger particles due to inertial and centrifugal forces are not diverted and are entrained in the undiverted fraction of the gas stream together with the particles entrained in said undiverted fraction.

Apparatus for carrying out the invention may comprise an inlet passage, an in-line duct, a branch duct and a filter arranged to collect particles entrained in the gas flowing in one or both of said ducts.

For use as a lung model simulator the branch duct is preferably re-entrant to as to cause the diverted fraction of the air stream to turn through at least a right angle and desirably nearer 180° C and a filter is provided at least in association with the re-entrant duct since it is the dust particles entrained in the diverted stream which the representative of those which would penetrate the pulmonary compartment of the lung. An estimate of the total dust concentration in the air sample is usually also required and therefore a filter may be provided in association with the in-line duct.

In a preferred arrangement the inlet passage and in-line duct are annular and the branch duct is an annular slot communicating with a central chamber. The outlet from the central chamber is conveniently co-planar with the outlet from the in-line duct whereby central and annular areas of a single filter paper may serve as the respective filters.

In order that the nature of the invention may be more readily understood reference is directed to the accompanying drawings illustrating by way of example one embodiment of the invention.

In the drawings:

FIG. 1 is a plan view,

FIG. 2 is a cross section on the line II—II of FIG. 1 and,

FIG. 3 is a curve relating percentage deposition of particles in the pulmonary compartment of the human lung to their aerodynamic diameter.

The embodiment illustrated is designed to sample dust in dust laden air and to collect a sample having a size distribution substantially the same as would be collected in the pulmonary compartment of the human lung.

The device comprises a casing 1 formed with an outlet duct 2. A ledge 3 in the casing 1 supports a porous disc 4 on which is a filter paper 5. A plug member 6 is fitted with an O-ring 7 so as to seal with and be a push fit into the casing 1. The plug member 6 is conveniently made of three separate parts, an outer ring 6*a*, an inner ring 6*b* and a central cap 6*c* connected together in spaced relationship by three spider members 8. The spaces provide an annular inlet passage 9, an annular in-line duct 10 and a re-entrant branch duct 11 communicating with a central chamber 12.

In operation, continuous steady suction is applied to the outlet duct 2 so as to induce a flow of air to be sampled into the inlet passage 9. The entrance to the passage 9 has radiused edges 13 and the length of the passage in relation to its width is such as to minimize turbulence and ensure substantially laminar flow.

As the air stream passes the entrance to the branch duct 11 a fraction of the air is sucked as shown by the streamlines in FIG. 2 into the central chamber 12 and proceeds to the outlet 2 through a central region of the filter paper 5 and the remainder proceeds without substantial change of direction through an outer annular region of the filter paper 5. The relative areas of the said inner and outer regions and the parameters of the branch duct 11 are chosen in this embodiment such that about 38 percent of the air flow enters the central chamber 12.

After a period of operation the filter paper 5 is removed, the central region punched out and the mass (or activity if radio-active) of the particles deposited in the two regions can be determined by weighing or active particle counting.

The particles deposited in the outer annular region will be those heavier particles which due to inertial and centrifugal forces have resisted entrainment into the branch duct 11 and have proceeded into the in-line duct 10. There is not, however, a sharp cut-off due to the fact that only a fraction of the incident particles are size segregated.

Referring now to FIG. 3, the curve gives the percentage deposition of particles in relation to their aerodynamic size in the pulmonary compartment of a suggested human lung model operating at 15 respirations a minute and a mean tidal volume of 1,430 $cm^3$ per minute.

By suitable choice of the dimensional parameters of the embodiment illustrated the selective response can be made to approximate very closely to that of the lung model represented by the curve.

The experimental values represented at points *x* were obtained with a device as illustrated having the following dimensions:

| | |
|---|---|
| Inlet passage 9 | |
| Inner diameter | 0.600 in. |
| Radial width | 0.025 in. |
| Length (depth of cap 6*c*) | 0.210 in. |
| In-line duct 10 | |
| Inner diameter | 0.580 in. |
| Outer diameter | 0.650 – 0.830 in. |
| Length | 0.220 in. |
| Filter paper areas | |
| Central | 0.168 sq. in. |
| Outer annular | 0.278 sq. in. |

The above dimensions ensure that when the device is operated at a sampling rate of 2 liters per minute the air velocity where part of the air stream changes direction is such as to give a separation characteristic having substantially the slope of the curve of FIG. 3 as is evident from the position of the experimental points $x$. The separation characteristic in the diverted stream is, in fact, very similar to that obtained in impact systems comprising an air jet playing on a flat surface.

If it is required to match a lung model having a different slope it is necessary to alter the velocity and thus the centrifugal effect where part of the air stream changes direction and enters the branch duct 11. This can be done by scaling the dimensions up or down and decreasing or increasing respectively the flow velocity through the whole system. An increase in velocity will increase the slope. The curve can also, in effect, be moved bodily up or down by increasing or decreasing respectively the percentage draw off into the branch duct.

The annular embodiment shown has the advantage of providing the equivalent of a small jet diameter in a compact volume. However, a long narrow slot system equivalent to a linear development of the above described device could be employed for the purposes of the invention.

Figure 1:
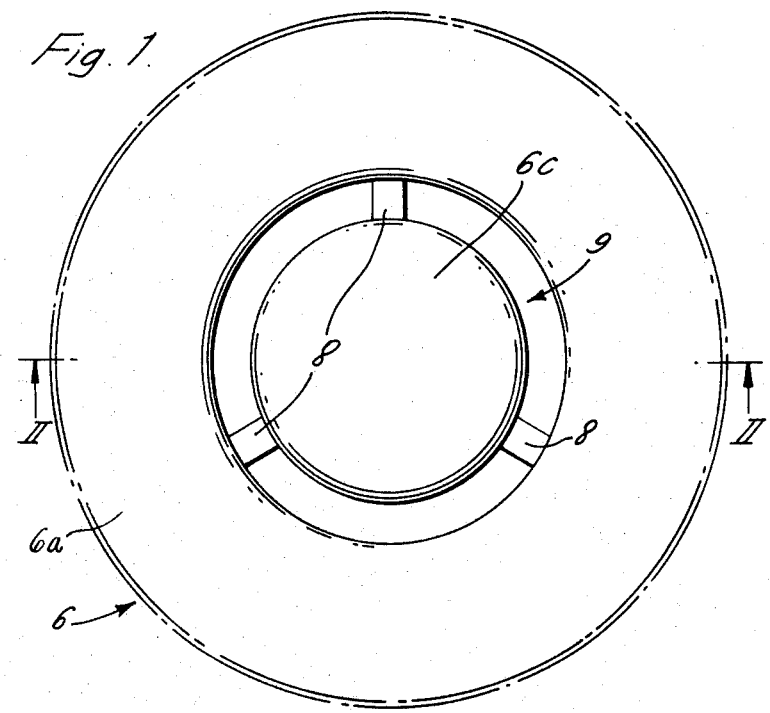
Figure 2:
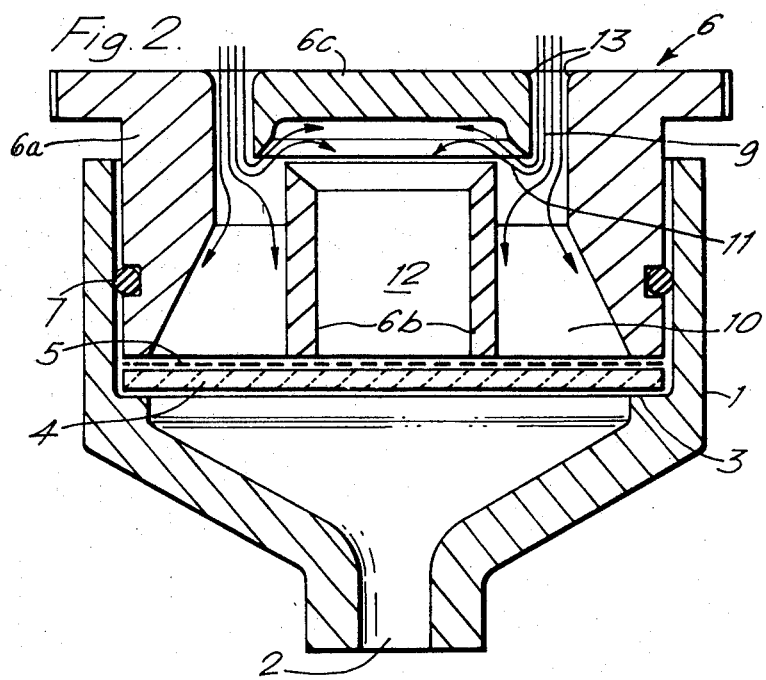

In another arrangement, not necessarily applicable to simulating a lung model, the device of FIGS. 1 and 2 is turned inside out. The inlet passage 9 then becomes a simple circular duct and the branch passage 11 branches outwardly from this duct.

I claim:

1. Apparatus for size selective separation of particulate matter in a gas suspension comprising a casing, a separating chamber open at each end disposed within the casing so as to define an annular duct therewith, said casing having a gas inlet and a gas outlet, said gas inlet, said gas outlet and said annular duct all being in line with each other, a re-entrant branch duct means for diverting a fraction of the gas suspension including smaller particles entering the annular duct into one open end of the separating chamber by causing said diverted fraction to turn through more than a right angle, the undiverted fraction of said suspension including larger particles passing through said annular duct, said annular duct having an outlet substantially coplanar with the other open end of said separating chamber, and filter means disposed adjacent at least one of said duct outlet or other open end and intermediate said casing inlet and outlet for collecting particulate matter contained in gas flowing through at least one of said annular duct and said separating chamber.

2. Apparatus as claimed in claim 1 wherein said filter means collects particulate matter contained in gas flowing through said annular duct and said separating chamber.

3. Apparatus as claimed in claim 1 wherein said branch duct comprises an annular slot interconnecting said annular duct and said separating chamber.

4. Apparatus as claimed in claim 1 wherein said filter means comprises a single sheet of filter material extending across said annular duct and said separating chamber outlet.

* * * * *